(12) United States Patent
Ohira et al.

(10) Patent No.: US 7,328,989 B2
(45) Date of Patent: Feb. 12, 2008

(54) WATER BASE INK SET FOR INK-JET RECORDING

(75) Inventors: Hideo Ohira, Tajimi (JP); Yoshito Toyoda, Nagoya (JP); Masahito Kato, Nagoya (JP); Ryuji Kato, Aichi-ken (JP); Akihiko Taniguchi, Aichi-ken (JP); Kazuma Goto, Nagoya (JP); Masaya Fujioka, Nagoya (JP); Shunichi Higashiyama, Yotsukaichi (JP)

(73) Assignee: Brother Kogyo Kabushiki Kaisha, Nagoya-shi (JP)

( * ) Notice: Subject to any disclaimer, the term of this patent is extended or adjusted under 35 U.S.C. 154(b) by 158 days.

(21) Appl. No.: 10/845,877

(22) Filed: May 13, 2004

(65) Prior Publication Data

US 2004/0227800 A1    Nov. 18, 2004

(30) Foreign Application Priority Data

May 13, 2003    (JP) ............................. 2003-134878

(51) Int. Cl.
  *C09D 11/00*    (2006.01)
(52) U.S. Cl. .................................... 347/100
(58) Field of Classification Search ............... 347/100; 340/447, 568.1, 572.1, 572.2, 572.3, 572.5, 340/572.7, 571, 741, 10.1, 10.4, 572.8, 573.1, 340/10.5; 343/700 R, 866
See application file for complete search history.

(56) References Cited

U.S. PATENT DOCUMENTS

| | | | | |
|---|---|---|---|---|
| 5,345,222 A | * | 9/1994 | Davies et al. ............ | 340/572.7 |
| 5,810,915 A | * | 9/1998 | Nagai et al. ............. | 106/31.43 |
| 5,880,752 A | * | 3/1999 | Weber et al. ................. | 347/15 |
| 6,386,695 B1 | * | 5/2002 | Kowalski .................... | 347/100 |
| 6,604,817 B2 | | 8/2003 | Isono et al. | |
| 6,631,974 B2 | | 10/2003 | Shindo | |
| 6,709,095 B2 | | 3/2004 | Sago et al. | |
| 6,927,738 B2 | * | 8/2005 | Senba et al. ................ | 343/787 |
| 2002/0033117 A1 | * | 3/2002 | Inoue et al. ............. | 106/31.68 |
| 2002/0109744 A1 | | 8/2002 | Shindo | |
| 2003/0058318 A1 | * | 3/2003 | Sago et al. ................ | 347/100 |
| 2003/0061965 A1 | * | 4/2003 | Taguchi ................... | 106/31.27 |

FOREIGN PATENT DOCUMENTS

| | | |
|---|---|---|
| JP | 2001-246744 | 9/2001 |
| JP | 2002-234151 | 8/2002 |

* cited by examiner

*Primary Examiner*—Stephen Meier
*Assistant Examiner*—Laura E. Martin
(74) *Attorney, Agent, or Firm*—Reed Smith LLP

(57) ABSTRACT

An ink set for ink-jet recording comprises a pigment ink and a dye ink containing a pigment and a dye as coloring agent, respectively. The pigment ink contains water, a water-soluble organic solvent, and a negatively charged pigment wherein potassium ion and sodium ion have a total ion concentration of not more than 200 ppm, and divalent or multivalent metal ion or ions have a total ion concentration of not more than 10 ppm. The dye ink contains water, a water-soluble organic solvent, and a dye associated with a counter ion of lithium ion wherein potassium ion and sodium ion have a total ion concentration of not more than 400 ppm, and divalent or multivalent metal ion or ions have a total ion concentration of not more than 10 ppm. In the ink set, the pigment and dye inks can be used in combination without complicating a maintenance system.

13 Claims, 2 Drawing Sheets

WATER BASE INK SET FOR INK-JET RECORDING

BACKGROUND OF THE INVENTION

1. Field of the Invention

The present invention relates to a water base ink set for ink-jet recording and an ink-jet recording apparatus based on the use of the same.

2. Description of the Related Art

In the ink-jet recording system, ink droplets are formed by using of the ink discharge system including, for example, the electrostatic attraction method, the method in which mechanical vibration or displacement is applied to the ink by using a piezoelectric element or the like, and the method in which bubbles are generated by heating the ink to utilize the pressure generated thereby. All or a part of the ink droplets are adhered to a recording objective material such as paper to perform the recording.

Those hitherto employed in many cases as the ink to be used when the recording is performed by using the ink-jet system include dye inks in which dyes such as direct dyes and acid dyes are used as coloring agents, for the following reason. That is, in the case of the dye ink, any inconvenience such as precipitation is hardly caused, and the handling of the ink is relatively easy, because the dye is dissolved in the ink. Further, in the case of the dye ink, the dye molecules absorb the light at a wavelength inherent in the dye molecules without allowing the dye molecules to cause any irregular reflection of the light on the surface and at the inside of the paper. Therefore, the dye ink is advantageous in that the printing can be performed with vivid coloration.

However, in the case of the dye ink, the dye is dissolved in the ink at the molecular level. Therefore, the dye behaves in the same manner as the solvent medium used for the ink after the printing. Therefore, the dye ink is disadvantageous in that the dye permeates into the paper and the concentration is lowered in the image area. Therefore, the pigment ink, which is based on the use of the pigment as the coloring agent, is presently used in many cases. In the case of the pigment ink, the pigment contained in the ink does not behave in the same manner as the ink solvent. The pigment particles are prohibited from movement, for example, by the additive and the fiber contained in the paper, and they do not permeate into the paper. Therefore, the amount of the pigment remaining on the paper surface is increased. As a result, it is possible to increase the concentration in the image area, and it is possible to enhance the contrast as well. The printer based on the ink-jet system involves a common problem, i.e., a problem of blurring in which the edge of the image area is notched due to the nonuniform spread of the ink. However, the pigment, which is dispersed as the solid content in the pigment ink, is prohibited from movement, for example, by the additive and the fiber contained in the paper, on the surface of the paper and/or at the inside of the paper. Therefore, the ink is scarcely blurred, and it is possible to obtain the sharp edge of the image area.

However, the pigment, which is dispersed in the pigment ink, has been disadvantageous in that the vividness of the printing is lowered, because the pigment particles irregularly reflect the light on the surface of the paper and/or at the inside of the paper. In view of the above, an ink-jet printer is commercially available in recent years, which carries an ink set comprising a black ink based on the use of a pigment as a coloring agent and a color ink based on the use of a dye as a coloring agent. When the printing is performed by using such an ink set, the following feature is obtained. That is, the letter edges are sharp, the contrast is high, and the visual recognition performance of the letters is excellent when letter data principally based on the use of the black color is subjected to the printing. When graphic data is subjected to the printing, color portions provide vivid coloration. Therefore, it is possible to satisfy both of the visual recognition performance of the letters and the vividness of the color portions.

However, as for the ink set composed of the pigment ink based on the use of the pigment as the coloring agent and the dye ink based on the use of the dye as the coloring agent, when the pigment ink and the dye ink make contact with each other and they are mixed with each other, then the pigment in the pigment ink, which is charged to have the negative electric charge, is bound to sodium ion as counter ion of the dye contained in the dye ink, and the electric charge of the negatively charged pigment becomes zero. Therefore, the electric repulsive force of the pigment is lost, the dispersion becomes unstable, and any coagulation occurs.

A conventional ink-jet recording apparatus is disclosed in Japanese Laid-Open Patent Publication No. 2002-234151 corresponding to U.S. Pat. No. 6,631,974. The ink-jet recording apparatus comprises a printing head and a mechanism for collectively wiping nozzles for respective colors included in the printing head. In the case of the ink-jet recording apparatus as described above, the nozzle arrays of the respective colors, which are arranged in the printing head, are disposed extremely approximately to one another. For this reason, the following structure is provided. That is, a suction cap, which is equipped to suck and purge the ink contained in the printing head, collectively covers the nozzle arrays of two colors. In this structure, for example, the nozzles arrays of the black ink and the cyan ink are collectively covered with the suction cap. Therefore, when the suction purge is performed, for example, upon the initial introduction of the inks, then the inks of two colors, which are simultaneously sucked by the aid of the suction cap as described above, are mixed with each other in the suction cap, they thereafter arrive at a suction pump via a tube, and they are discharged to a drain tank.

In the case of the ink-jet recording apparatus as described above, the maintenance system is simplified, and it is possible to suppress the production cost to be cheap. However, for example, when the inks are initially introduced, then the pigment ink and the dye ink are mixed with each other, for example, in the printing head nozzle, the wiper, the suction cap, the suction pump, and the drain tank, and the pigment particles are coagulated. As a result, the printing head nozzle is clogged by the pigment coagulate, and/or the pigment coagulate is adhered and secured to the neighborhoods of the nozzles to damage the repelling ink coat surface. Consequently, the discharge failure is caused, and the printing quality is deteriorated in some cases. Further, when the pigment coagulate is adhered and secured to the wiper and the suction cap, then the wiping operation is nonuniformly performed, and the air-tightness of the suction cap is deteriorated. Furthermore, another inconvenience also arises, for example, such that the pigment coagulate is secured to the interior of the suction pump to cause any malfunction. When the pigment particles are coagulated, the reliability of the ink-jet recording apparatus is extremely deteriorated.

In order to respond to the inconveniences as described above, for example, the following countermeasures are applied. That is, a plurality of wipers are arranged so that the pigment ink and the dye ink are not mixed with each other in the vicinity of the nozzles. The heads are provided in a divided manner for the pigment ink and the dye ink respectively. The maintenance system is divided into those to be used for the pigment ink and the dye ink. However, even when the countermeasures as described above are applied, a problem arises such that the production cost of the printer becomes expensive. Therefore, an ink set has been required, in which the pigment ink and the dye ink can be used in combination, the pigment is not coagulated, and it is possible to obtain a high printing quality even when the ink set is carried on a conventional low cost ink-jet recording apparatus.

SUMMARY OF THE INVENTION

The present invention has been made in order to solve the problems as described above, an object of which is to provide a water base ink set for ink-jet recording and an ink-jet recording apparatus provided with the same in which a pigment ink and a dye ink can be used in combination without complicating the arrangement of a maintenance system, and a stable printing quality is obtained with high reliability. Another object of the present invention is to provide a dye ink for ink-jet recording which can be suitably used in combination with a pigment ink containing a negatively charged pigment.

According to a first aspect of the present invention, there is provided a water base ink set for ink-jet recording comprising:

a pigment ink which contains water, a water-soluble organic solvent, and a negatively charged pigment wherein a total ion concentration of potassium ion and sodium ion is not more than 200 ppm, and a total ion concentration of divalent or multivalent metal ion or ions is not more than 10 ppm; and a dye ink which contains water, a water-soluble organic solvent, and a dye associated with a counter ion of lithium ion wherein a total ion concentration of potassium ion and sodium ion is not more than 400 ppm, and a total ion concentration of divalent or multivalent metal ion or ions is not more than 10 ppm. The pigment ink may be a black ink, and the dye ink may be a color ink.

The ink set of the present invention may be in a form of ink cartridge. The ink cartridge may have, for example, compartments in which the pigment ink and the dye ink are accommodated respectively. The ink cartridge may be mounted on an ink-jet head. Alternatively, the ink cartridge may be attached to the interior of a main body case of an ink-jet recording apparatus. In the case of the latter, the ink is supplied from the ink cartridge to the ink-jet head, for example, via a flexible tube.

According to a second aspect of the present invention, there is provided a dye ink for ink-jet recording comprising water, a water-soluble organic solvent, and a dye associated with a counter ion of lithium ion wherein a total ion concentration of potassium ion and sodium ion is not more than 400 ppm, and a total ion concentration of divalent or multivalent metal ion or ions is not more than 10 ppm.

According to a third aspect of the present invention, there is provided an ink-jet recording apparatus comprising:

an ink-jet head which is formed with nozzles for jetting an ink of a first color and nozzles for jetting an ink of a second color different from the first color; and a maintenance unit which includes a wiper for wiping the nozzles for the first and second colors, a suction cap for capping the nozzles, a suction pump for sucking the ink by the suction cap, and a drain tank for storing a drain discharged from the suction pump, wherein:

the ink of the first color is a pigment ink which contains water, a water-soluble organic solvent, and a negatively charged pigment wherein a total ion concentration of potassium ion and sodium ion is not more than 200 ppm, and a total ion concentration of divalent or multivalent metal ion or ions is not more than 10 ppm; and the ink of the second color is a dye ink which contains water, a water-soluble organic solvent, and a dye associated with a counter ion of lithium ion wherein a total ion concentration of potassium ion and sodium ion is not more than 400 ppm, and a total ion concentration of divalent or multivalent metal ion or ions is not more than 10 ppm. The first color may be black, and the second color may be one of magenta, yellow, and cyan.

DESCRIPTION OF THE PREFERRED EMBODIMENTS

Figure 1:
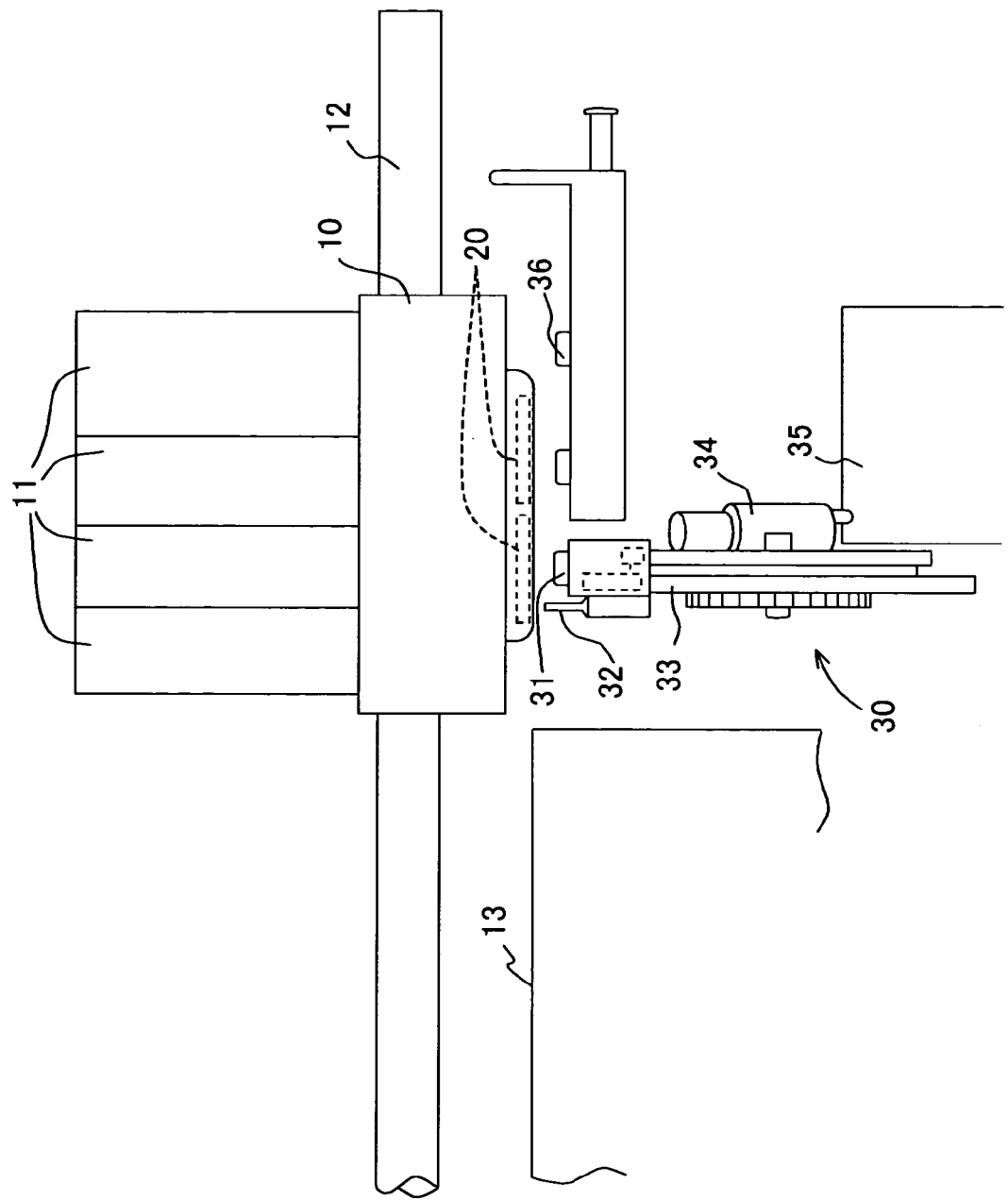
FIG. 1 shows a front view illustrating an internal structure of an ink-jet recording apparatus.

As a result of diligent investigations, the inventors have found out the fact that the stable discharge operation can be performed even when the pigment ink and the dye ink are used in combination by using the ink containing the negatively charged pigment as the pigment ink, using the ink associated with the counter ion of lithium as the dye ink, and suppressing the ion concentration of the specified metal ion contained in the ink to be not more than the certain concentration. Thus, the present invention has been completed.

The water base ink set for ink-jet recording of the present invention comprises the pigment ink which contains the pigment as the coloring agent and the dye ink which contains the dye as the coloring agent.

The pigment ink contains the negatively charged pigment. The negatively charged pigment may include, for example, self-dispersing type pigments in which a chemical treatment is applied to introduce, for example, carboxyl group and/or sulfonated functional group on the surface of the negatively charged pigment so that the water dispersibility is given thereby and the negative zeta potential is provided, and dispersing agent-aided dispersing type pigments in which the dispersion state is given by any dispersing agent such as a surfactant or a high molecular weight dispersing agent and the negative zeta potential is provided.

The self-dispersing type pigment may include, for example, CAB-O-JET 300, CAB-O-JET 200, CAB-O-JET 250, CAB-O-JET 260, and CAB-O-JET 270 (produced by Cabot).

The pigment may include, for example, those obtained by dispersing pigments such as carbon black as well as organic pigments represented, for example by azo pigments such as azo lake, insoluble azo pigment, condensed azo pigment, and chelate azo pigment; polycyclic pigments such as phthalocyanine pigment, perylene pigment, perynone pigment, anthraquinone pigment, quinacridone pigment, dioxazine pigment, thioindigo pigment, isoindolone pigment, and quinophthalone pigment; dye lakes such as acidic dye type lake; nitro pigments; nitroso pigments; and aniline black daylight fluorescent pigments, by using the dispersing agent such as the surfactant and the high molecular weight dispersing agent. Other pigments are also usable provided that they are dispersible in the aqueous phase. Further, it is also possible to use those obtained by surface-treating the pigment as described above, for example, with the surfactant or the high molecular weight dispersing agent, for example, graft carbon. However, it is necessary that the pigment is negatively charged in the ink, i.e., the zeta potential is negative.

Among the pigments as described above, carbon black may be exemplified as the most general black pigment. The carbon black pigment may include, for example, furnace black, lamp black, acetylene black, and channel black.

Specifically, for example, there may be exemplified No. 25, No. 33, No. 40, No. 47, No. 52, No. 900, No. 2300, MCF-88, MA 600, MA 7, MA 8, and MA 100 (produced by Mitsubishi Chemical Corporation); Color Black FW1, Color Black FW2, Color Black FW2V, Color Black FW18, Color Black FW200, Color Black S150, Color Black S160, Color Black S170, Printex 35, Printex 150T, Printex U, Printex V, Printex 140U, Printex 140V, Special Black 6, Special Black 5, Special Black 4A, and Special Black 4 (produced by Degussa); Raven 7000, Raven 5750, Raven 5250, Raven 5000, Raven 3500, Raven 2000, Raven 1500, Raven 1250, Raven 1200, Raven 1190 ULTRA-II, Raven 1170, and Raven 1255 (produced by Columbia); and Black Pearls L, Regal 400R, Regal 330R, Regal 660R, Mogul L, Monarch 700, Monarch 800, Monarch 880, Monarch 900, Monarch 1000, Monarch 1100, Monarch 1300, Monarch 1400, and Valcan (produced by Cabot). When the pigment as described above is used as the coloring agent for the pigment ink, the pigment can be dispersed in accordance with any conventionally known method by using, for example, a dispersing agent or another additive. It is not necessarily indispensable to perform any dispersing treatment for the self-dispersing type dispersing agent as described above.

In the pigment ink described above, the total ion concentration of the potassium ion and the sodium ion is not more than 200 ppm, for the following reason. That is, if the total ion concentration of the potassium ion and the sodium ion exceeds 200 ppm, then the negatively charged pigment is bound to the potassium ion and the sodium ion, the dispersion of the negatively charged pigment is unstable thereby, and the negatively charged pigment is mutually coagulated. Either the potassium ion or the sodium ion may be contained in the pigment ink provided that the ion concentration of either ion is not more than 200 ppm.

In the pigment ink described above, the total ion concentration of the divalent or multivalent metal ion or ions is not more than 10 ppm. In the pigment ink described above, it is necessary that the negatively charged pigment is prevented from any occurrence of coagulation in order to maintain the dispersion stability of the negatively charged pigment as the coloring agent. The dispersion stability of the negatively charged pigment in the pigment ink is affected by the type and the concentration of the metal ion. For example, if any monovalent metal ion such as sodium ion and potassium ion, any divalent metal ion such as calcium ion and magnesium ion, and any trivalent or multivalent metal ion such as aluminum ion and titanium ion are excessively contained in the pigment ink, then the metal ion is bound to the negative charge on the pigment surface because the metal ion as described above has the positive charge, and the electric charge becomes zero. As a result, the electric repulsive force of the pigment is lost, the dispersion becomes unstable, and the coagulation occurs. In particular, the divalent or multivalent metal ion has an extremely large effect to destabilize the dispersion state of the pigment as compared with the monovalent metal ion. Therefore, even if the divalent or multivalent metal ion exists in an extremely minute amount as compared with the monovalent metal ion, the dispersion state of the pigment is harmfully affected. Therefore, if the ion concentration of the divalent or multivalent metal ion exceeds 10 ppm, then the dispersion of the pigment becomes unstable, and the coagulation takes place. Further, it is preferable that the total ion concentration of divalent or multivalent metal ion is not more than 5 ppm in the pigment ink.

The reason, why the divalent or multivalent metal ion has the extremely large effect to destabilize the dispersion state of the pigment as compared with the monovalent metal ion, can be explained in accordance with the Schulze-Hardy's law. According to the Schulze-Hardy's law, the coagulation, which is caused when an electrolyte is added to a hydrophobic sol, is affected by only the colloid particles and the ion having the opposite charge, wherein as the ion valency is larger, the coagulating effect appears more conspicuously. According to this law, the divalent ion has the coagulating force which is 20 to 80 times that of the monovalent ion, the trivalent ion has the coagulating force which is square of that of the divalent ion, and the tetravalent or multivalent ion has the coagulating force which is much larger than the above.

The divalent or multivalent metal ion as described above may include, for example, barium ion, magnesium ion, calcium ion, zinc ion, iron ion, copper ion, chromium ion, aluminum ion, nickel ion, cobalt ion, manganese ion, lead ion, stannum ion, titanium ion, and zirconium ion. The method for reducing the ion concentration of the divalent or multivalent metal ion as described above may include, for example, a treatment in which the pigment ink is allowed to pass through a cation exchange resin.

The dye ink contains the dye of which the counter ion is lithium ion when the dye is solved in a water based solvent. The lithium ion is a monovalent metal ion. Therefore, the polarized water molecules surround and cover the lithium ions in the water base ink for ink-jet recording to form loose clusters. However, the lithium ion has a relatively small ion radius of 0.60 angstrom, and hence the amount of adsorption of water molecules per one electric charge (ion valency) is small. For this reason, it is considered that the binding force per one water molecule is strengthened, and the water molecules are not easily disengaged from the lithium ion. Therefore, even when the lithium ion approaches the negative electric charge existing on the pigment surface in the pigment ink when the pigment ink and the dye ink are subjected to the contact and the mixing with each other, then the water molecule enters between the both, the effect to inhibit the binding is relatively increased, and the negative electric charge on the pigment surface is hardly bonded to the lithium ion. Consequently, it is considered that the electric repulsive force of the negatively charged pigment is not lost, and hence the dispersion stability of the pigment is maintained.

On the other hand, the sodium ion, which is generally used as the counter ion for the dye, has a relatively large ion radius of 0.95 angstrom. Therefore, the amount of adsorption of water molecules per one electric charge is large. For this reason, it is considered that the binding force per one water molecule is weakened, and the water molecules are easily disengaged due to the Brownian motion and the external force exerted by any external electric field or the like. Therefore, when the sodium ion approaches the negative charge existing on the pigment surface, the water molecules fail to enter therebetween to inhibit the binding between the both, resulting in the disengagement. Consequently, the negative charge of the pigment surface is bonded to the sodium ion, and the electric charge becomes zero. Accordingly, the electric repulsive force of the pigment is lost, and the dispersion becomes unstable to cause the coagulation. The ion radius of the potassium ion is 1.33 angstroms, which is larger than that of the sodium ion. Therefore, the pigment coagulation is caused for the same reason as that for the sodium ion. The size of the water molecule is 1.3 to 1.4 angstroms. The distance of O-H bond is 0.96 angstrom, and the angle of H-O-H bond is 104.5 degrees.

Those which are usable as the dye associated with the counter ion of lithium ion may include, for example, water-soluble dyes such as direct dyes, acid dyes, and reactive dyes. In particular, those which are preferably usable for the ink based on the ink-jet printing system and which satisfy the required performance such as vividness, water solubility, stability, light resistance, and other factors may include, for example, C. I. Direct Black 17, 19, 32, 51, 71, 108, 146, 154, 168; C. I. Direct Blue 6, 22, 25, 71, 86, 90, 106, 199; C. I. Direct Red 1, 4, 17, 28, 83, 227; C. I. Direct Yellow 12, 24, 26, 86, 98, 132, 142; C. I. Direct Orange 34, 39, 44, 46, 60; C. I. Direct Violet 47, 48; C. I. Direct Brown 109; C. I. Direct Green 59; C. I. Acid Black 2, 7, 24, 26, 31, 52, 63, 112, 118; C. I. Acid Blue 9, 22, 40, 59, 93, 102, 104, 113, 117, 120, 167, 229, 234; C. I. Acid Red 1, 6, 32, 37, 51, 52, 80, 85, 87, 92, 94, 115, 181, 256, 289, 315, 317; C. I. Acid Yellow 11, 17, 23, 25, 29, 42, 61, 71; C. I. Acid Orange 7, 19; and C. I. Acid Violet 49. However, the dye, which is associated with the counter ion of lithium ion, is not limited to the dyes as described above. Each of the dyes, which is associated with the counter ion of lithium ion, may be used singly. Alternatively, two or more of the dyes as described above may be used in combination.

It is preferable that the content of the dye associated with the counter ion of lithium ion is 0.5 to 10% by weight. The dye contains many cations as impurities. Therefore, it is preferable to use those in which the impurities are removed by purification. As for the purification method, Japanese Pat. Application Laid-open No. 9-25441 discloses a specified method for removing potassium ion or the like. The purification can be performed in accordance with any method similar thereto. However, there is no limitation to the method as described above.

In the dye ink, the total ion concentration of the potassium ion and the sodium ion is not more than 400 ppm, for the following reason. That is, if the total ion concentration exceeds 400 ppm, then the dispersion of the negatively charged pigment becomes unstable, and the coagulation occurs, due to the bonding between the negatively charged pigment contained in the pigment ink and the potassium ion and the sodium ion when the pigment ink and the dye ink are subjected to the contact and the mixing. Either the potassium ion or the sodium ion may be contained in the dye ink provided that the ion concentration of either ion is not more than 400 ppm. More preferably, the total ion concentration of the potassium ion and the sodium ion in the dye ink is not more than 200 ppm.

In the dye ink, the total ion concentration of the divalent or multivalent metal ion is not more than 10 ppm. As for the dye ink, it is necessary that no deposition of the dye is caused in order to maintain the dissolution stability of the acid dye and the direct dye as the coloring agent. The dissolution stability of the dye in the dye ink is affected by the type and the concentration of the metal ion. For example, if any monovalent metal ion such as sodium ion and potassium ion, any divalent metal ion such as calcium ion and magnesium ion, and any trivalent or multivalent metal ion such as aluminum ion and titanium ion are excessively contained in the dye ink, then the negative electric charge of the dye is bound to the metal ion, because the metal ions as described above have the positive electric charge. As a result, the electric charge becomes zero, the dissolution becomes unstable thereby, and the deposition takes place. In particular, the divalent or multivalent metal ion has an extremely large effect to destabilize the dissolution state of the dye as compared with the monovalent metal ion. Therefore, even when the amount is extremely minute, the divalent or multivalent metal ion harmfully affects the dissolution state of the dye as compared with the monovalent metal ion. Therefore, if the ion concentration of the divalent or multivalent metal ion exceeds 10 ppm, then the dissolution state of the dye becomes unstable, and the deposition occurs.

The reason, why the divalent or multivalent metal ion has the extremely large effect to destabilize the dissolution state of the dye as compared with the monovalent metal ion, is the same as that for the pigment ink as described above. The ion concentration of the divalent or multivalent metal ion in the dye ink is preferably not more than 5 ppm.

The divalent or multivalent metal ion may include, for example, barium ion, magnesium ion, calcium ion, zinc ion, iron ion, copper ion, chromium ion, aluminum ion, nickel ion, cobalt ion, manganese ion, lead ion, stannum ion, titanium ion, and zirconium ion.

The pigment ink and the dye ink contain water. As for the water, it is preferable to use those having high purities such as ion exchange water, distilled water, pure water, and ultrapure water other than ordinary water.

The pigment ink and the dye ink contain the water-soluble organic solvent. The water-soluble organic solvent is principally used in order to avoid the drying-up and the occurrence of deposition from the ink at the tip of the ink-jet head. The water-soluble organic solvent is not specifically limited. However, it is preferable to use those having low volatility and high dye solubility. The water-soluble organic solvent may include, for example, polyvalent alcohols such as ethylene glycol, diethylene glycol, triethylene glycol, polyethylene glycol, propylene glycol, dipropylene glycol, tripropylene glycol, polypropylene glycol, 1,3-butanediol, 1,5-pentanediol, 1,6-hexanediol, glycerol, 1,2,6-hexanetriol, 1,2,4-butanetriol, 1,2,3-butanetriol, and petriol; nitrogen-containing heterocyclic compounds such as N-methyl-2-pyrrolidone, N-hydroxyethyl-2-pyrrolidone, 2-pyrrolidone, 1,3-dimethylimidazolidinone, and $\epsilon$-caprolactam; amides such as formamide, N-methylformamide, and N,N-dimethylformamide; amines such as monoethanolamine, diethanolamine, triethanolamine, monoethylamine, diethylamine, and triethylamine; and sulfur-containing compounds such as dimethylsulfoxide, sulfolane, and thiodiethanol. The water-soluble organic solvent as described above may be used singly. Alternatively, two or more of the water-soluble organic solvents as described above may be used in combination.

It is preferable that the content of the water-soluble organic solvent is 5 to 40% by weight. If the content is less than 5% by weight, then the moistening function is insufficient, and any problem concerning the deposition and the drying-up may arise in some cases. If the content exceeds 40% by weight, the viscosity of the water base ink for ink-jet recording of the present invention is unnecessarily increased. As a result, any problem may arise in some cases such that the discharge cannot be performed and/or the ink is dried on the recording paper extremely slowly. The content is more preferably 7 to 40% by weight and much more preferably 10 to 35% by weight.

Polyvalent alcohol alkyl ether may be used, if necessary, in order to control the permeability. The polyvalent alcohol alkyl ether may include, for example, diethylene glycol monomethyl ether, diethylene glycol monobutyl ether, diethylene glycol monoisobutyl ether, diethylene glycol dimethyl ether, diethylene glycol diethyl ether, diethylene glycol dibutyl ether, dipropylene glycol monomethyl ether, dipropylene glycol monopropyl ether, dipropylene glycol monoisopropyl ether, dipropylene glycol monobutyl ether, dipropylene glycol dimethyl ether, dipropylene glycol dipropyl ether, dipropylene glycol dibutyl ether, triethylene glycol monomethyl ether, triethylene glycol monobutyl ether, tripropylene glycol monomethyl ether, tripropylene glycol monobutyl ether, triethylene glycol dimethyl ether, triethylene glycol dibutyl ether, tripropylene glycol dimethyl ether, and tripropylene glycol dibutyl ether.

It is preferable that the content of the polyvalent alcohol alkyl ether is 0.05 to 15% by weight. If the content is less than 0.05% by weight, any problem concerning the drying time and the blurring may arise in some cases, because the permeation speed of the ink into the recording paper is slow. If the content exceeds 15% by weight, any problem may arise in some cases such that the water base ink for ink-jet recording of the present invention arrives at the back of the recording paper and/or the blurring occurs, because the permeation speed of the ink into the recording paper is too fast. It is also possible to use monovalent alcohol such as ethanol and isopropyl alcohol in order to control the performance of drying and permeation of the ink into the printing medium.

A surfactant may be used in order to adjust the surface tension of the ink and improve, for example, the discharge stability of the ink, the performance to introduce the ink into the head, and the printing quality. The surfactant is not specifically limited, which may include, for example, anionic surfactants such as EMAL, LATEMUL, LEVENOL, NEOPELEX, ELECTROSTRIPPER, NS SOAP, KS SOAP, OS SOAP, PELEX, and AMPHITOL series (produced by Kao Corporation), LIPOLAN, K LIPOLAN, LIPON, SUNNOL, LIPOTAC TE, ENAGICOL, LIPAL, LIONOL, and LOTAT series (produced by Lion Corporation); and nonionic surfactants such as EMULGEN, RHEODOL, RHEODOL SUPER, EMASOL, EMASOL SUPER, EXCEL, EMANON, AMIET, and AMINON series (produced by Kao Corporation), DOBANOX, LEOCOL, LEOX, LAOL, LEOCON, LIONOL, CADENAX, LIONON, LEOFAT, ETHOFAT, ETHOMEEN, ETHODUOMEEN, ETHOMID, and AROMOX (produced by Lion Corporation). The surfactant as described above may be used singly. Alternatively, two or more of the surfactants as described above may be used in combination.

The water base ink set for ink-jet recording of the present invention is basically constructed as described above. Other than the above, it is also possible to add, if necessary, conventionally known pH-adjusting agents, dye-dissolving agents, viscosity-adjusting agents, antiseptic/fungicidal agents, and rustproofing or rust preventing agents.

When the water base ink set for ink-jet recording of the present invention is applied to the ink-jet system in which the ink is discharged in accordance with the action of the thermal energy, thermal physical values including, for example, the specific heat, the coefficient of thermal expansion, and the coefficient of thermal conductivity are adjusted in some cases.

Figure 2:
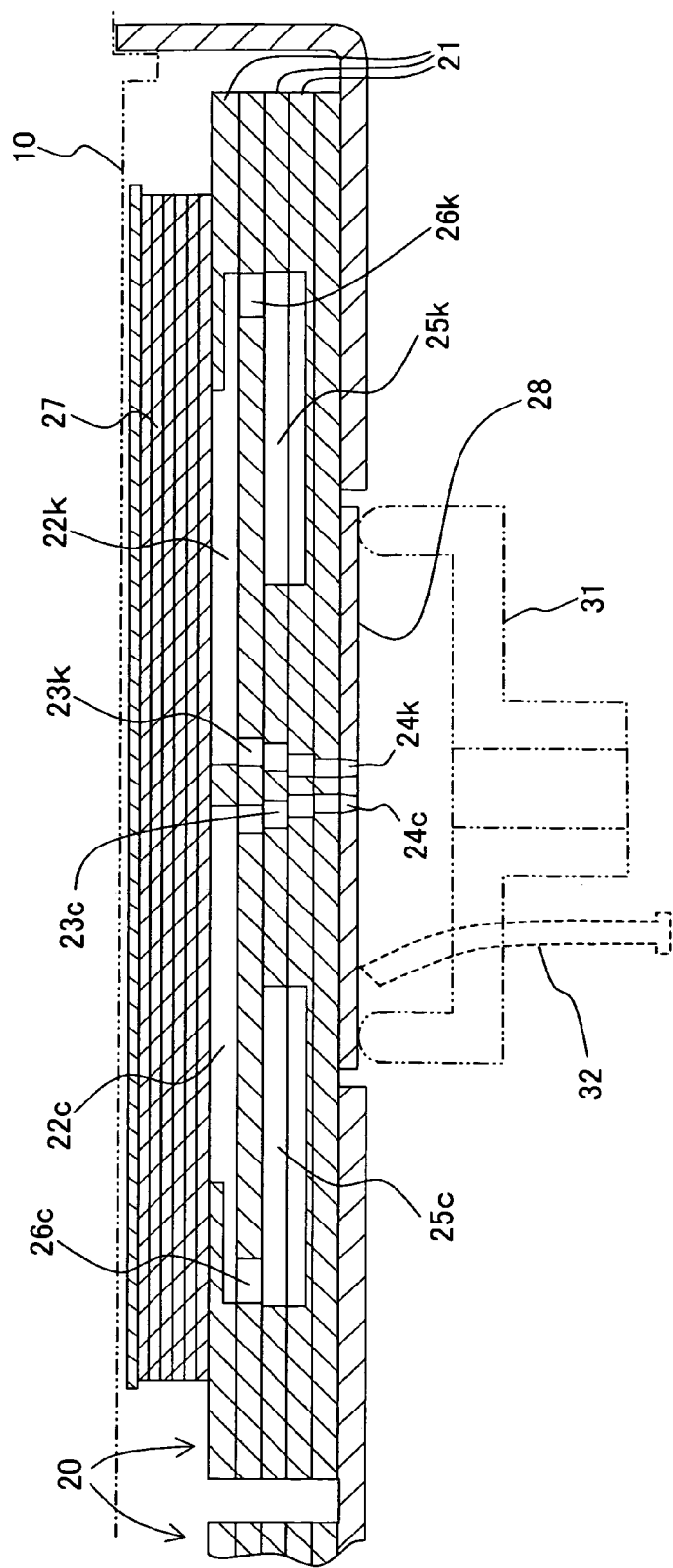
FIG. 2 shows a sectional view as viewed in a front direction illustrating an internal structure of a printing head.

The water base ink set for ink-jet recording of the present invention is preferably usable for an ink-jet recording apparatus having a structure as shown in FIGS. 1 and 2. The ink-jet recording apparatus has a maintenance unit comprising a wiper which collectively wipes nozzles for respective colors of a printing head, a suction cap which is capable of making contact and separation with respect to the nozzle surface, a suction pump which sucks the ink by the aid of the suction cap, and a drain tank which stores the drain discharged from the suction pump, wherein the pigment ink and the dye ink are mixed with each other in the maintenance unit. The structure or arrangement of the ink-jet recording apparatus shown in FIGS. 1 and 2 is basically the same as that of an ink-jet printer MFC-3100C (produced by Brother Industries, Ltd.) used in the ink evaluation as described later on.

As shown in FIG. 1, the printing heads 20 are mounted on a carriage 10. The printing heads 20 are moved along a shaft 12 in parallel to a recording objective material (printing paper) disposed on a printing paper transport section 13. Ink droplets are discharged from the printing head 20 onto the printing paper. Four ink cartridges 11, which contain a black ink, a yellow ink, a magenta ink, and a cyan ink respectively, are installed on the carriage 10. The black ink and the cyan ink are supplied to one printing head of the two printing heads 20 respectively, and the yellow ink and the magenta ink are supplied to the other printing head respectively. A plurality of nozzles 24$k$ for discharging the black ink and a plurality of nozzles 24$c$ for discharging the cyan ink, which form arrays in a direction perpendicular to the paper surface of FIG. 2, are provided at the lower surface (nozzle surface) 28 of the former printing head 20 although only two nozzles 24$k$, 24$c$ can be seen in FIG. 2. Nozzles for discharging the yellow ink and the magenta ink are also provided for the latter printing head 20 in the same manner as described above.

Each of the printing heads 20 is constructed in the same manner as the disclosure in Japanese Patent Application Laid-open No. 2001-246744 corresponding to U.S. Pat. No. 6,604,817 the content of which is incorporated herein by reference. The inks, which are supplied from the respective ink cartridges, pass through communication holes 26$k$, 26$c$ via common ink chambers 25$k$, 25$c$ which are independent for the respective nozzle arrays, and the inks are distributed to pressure-generating chambers 22$k$, 22$c$ which are independent for the respective nozzles. The pressure is applied by a piezoelectric actuator 27 to the inks contained in the respective pressure-generating chambers 22$k$, 22$c$. The inks pass through communication holes 23$k$, 23$c$, and they are discharged from the respective nozzles 24$k$, 24$c$. The respective chambers 25$k$, 25$c$, 22$k$, 22$c$ and the respective holes 26$k$, 26$c$, 23$k$, 23$c$ are formed as openings which are formed through a plurality of metal plate members 21, and they are communicated with each other by stacking the plate members 21. The plate member, which forms the nozzle surface 28, is formed of a synthetic resin material (polyimide), and a water-repellent film is formed on the surface.

A unit, which is indicated by reference numeral 30 in FIG. 1, is called "maintenance unit". A restoring treatment is applied to the printing head 20 periodically or when any discharge failure occurs in the printing head 20. When the carriage 10 is moved to a position deviated from the printing paper transport section 13, then the suction cap 31 approaches one printing head 20 by the aid of a cam 33, and the suction cap 31 covers or caps the nozzles 24$k$, 24$c$ to make tight contact with the nozzle surface 28. When the suction pump 34 is driven, then the inks contained in the two arrays of the nozzles 24k, 24c are simultaneously sucked by the aid of the suction cap 31, and the inks are discharged to the drain tank 35. After that, the suction cap 31 is separated from the nozzle surface 28. When it is necessary to perform the restoring treatment for the nozzles for the yellow ink and the magenta ink as well, the carriage 10 moves the nozzles for the yellow ink and the magenta ink to positions opposed to the suction cap 31 to repeat the same or equivalent operation. After that, when the wiper 32 approaches the printing head 20 by the aid of the cam 33, and the carriage 10 is moved along the shaft 12, then the wiper 32 collectively wipes, in the horizontal direction in the drawing, the nozzle surface 28 on which the nozzles 24k, 24c for the black ink and the cyan ink are open and the nozzle surface on which the nozzles for the yellow ink and the magenta ink are open. When the ink-jet printer pauses or stops, then the carriage 10 is moved to the position at which the two printing heads 20 are opposed to the storage caps 36 respectively, and all of the nozzles are covered with the storage caps 36. In FIG. 1, the ink cartridge 11 is carried on the printing head 20. However, the ink cartridge may be provided at an arbitrary position in an unillustrated recording apparatus main body case. In this arrangement, the ink cartridge and the printing head are connected to one another via a flexible tube for supplying the ink. The structure of the ink jet printer is disclosed, for example, in Japanese Laid-Open Pat. Publication No. 2002-234151 corresponding to U.S. Pat. No. 6,631,974 which content is incorporated herein by reference.

EXAMPLES

The present invention will be explained in further detail below as exemplified by Examples. However, the present invention is not limited to only Examples.

Example 1

A water base ink set for ink-jet recording having compositions shown in Table 1 was prepared by using a pigment ink as a black ink and using a dye ink as a cyan ink. A dye associated with a counter ion of lithium ion was used for the dye ink.

TABLE 1

| Example 1 | Pigment ink (black) | Dye ink (cyan) |
|---|---|---|
| CAB-O-JET 300 Black (produced by Cabot, pigment content: 15% by weight) | 33.0 | — |
| Direct Blue 199 (counter ion: Li) | — | 3.0 |
| Glycerol | 26.0 | 26.0 |
| Dipropylene glycol monopropyl ether | 0.5 | 0.5 |
| RHEODOL SUPER TWO-120 (produced by Kao Corporation) | 0.2 | 0.2 |
| PROXEL GLX (S) (produced by Avecia) | 0.4 | 0.4 |
| Pure water | 39.9 | 69.9 | unit: % by weight

Example 2

A water base ink set for ink-jet recording having compositions shown in Table 2 was prepared by using a pigment ink as a black ink and using a dye ink as a magenta ink. A dye associated with a counter ion of lithium ion was used for the dye ink.

TABLE 2

| Example 2 | Pigment ink (black) | Dye ink (magenta) |
|---|---|---|
| CAB-O-JET 300 Black (produced by Cabot, pigment content: 15% by weight) | 33.0 | — |
| Direct Red 227 (counter ion: Li) | — | 3.0 |
| Glycerol | 26.0 | 26.0 |
| Dipropylene glycol monopropyl ether | 0.5 | 0.5 |
| RHEODOL SUPER TWO-120 (produced by Kao Corporation) | 0.2 | 0.2 |
| PROXEL GLX (S) (produced by Avecia) | 0.4 | 0.4 |
| Pure water | 39.9 | 69.9 | unit: % by weight

Example 3

A water base ink set for ink-jet recording having compositions shown in Table 3 was prepared by using a pigment ink as a black ink and using a dye ink as a yellow ink. A dye associated with a counter ion of lithium ion was used for the dye ink.

TABLE 3

| Example 3 | Pigment ink (black) | Dye ink (yellow) |
|---|---|---|
| CAB-O-JET 300 Black (produced by Cabot, pigment content: 15% by weight) | 33.0 | — |
| Direct Yellow 132 (counter ion: Li) | — | 3.0 |
| Glycerol | 26.0 | 26.0 |
| Dipropylene glycol monopropyl ether | 0.5 | 0.5 |
| RHEODOL SUPER TWO-120 (produced by Kao Corporation) | 0.2 | 0.2 |
| PROXEL GLX (S) (produced by Avecia) | 0.4 | 0.4 |
| Pure water | 39.9 | 69.9 | unit: % by weight

Example 4

A water base ink set for ink-jet recording having compositions shown in Table 4 was prepared by using a pigment ink as a black ink and using dye inks as a cyan ink, a magenta ink, and a yellow ink. Dyes associated with a counter ion of lithium ion were used for the dye inks.

TABLE 4

| Example 4 | Pigment ink (black) | Dye ink (cyan) | Dye ink (magenta) | Dye ink (yellow) |
|---|---|---|---|---|
| CAB-O-JET 300 Black (produced by Cabot, pigment content: 15% by weight) | 33.0 | — | — | — |
| Direct Blue 199 (counter ion: Li) | — | 3.0 | — | — |
| Direct Red 227 (counter ion: Li) | — | — | 3.0 | — |
| Direct Yellow 132 (counter ion: Li) | — | — | — | 3.0 |
| Glycerol | 26.0 | 26.0 | 26.0 | 26.0 |
| Dipropylene glycol monopropyl ether | 0.5 | 0.5 | 0.5 | 0.5 |
| RHEODOL SUPER TWO-120 (produced by Kao Corporation) | 0.2 | 0.2 | 0.2 | 0.2 |
| PROXEL GLX (S) (produced by Avecia) | 0.4 | 0.4 | 0.4 | 0.4 |
| Pure water | 39.9 | 69.9 | 69.9 | 69.9 | unit: % by weight

Comparative Example 1

A water base ink set for ink-jet recording having compositions shown in Table 5 was prepared by using a pigment ink as a black ink and using a dye ink as a cyan ink. A dye associated with a counter ion of sodium ion was used for the dye ink.

TABLE 5

| Comparative Example 1 | Pigment ink (black) | Dye ink (cyan) |
|---|---|---|
| CAB-O-JET 300 Black (produced by Cabot, pigment content: 15% by weight) | 33.0 | — |
| Direct Blue 199 (counter ion: Na) | — | 3.0 |
| Glycerol | 26.0 | 26.0 |
| Dipropylene glycol monopropyl ether | 0.5 | 0.5 |
| RHEODOL SUPER TWO-120 (produced by Kao Corporation) | 0.2 | 0.2 |
| PROXEL GLX (S) (produced by Avecia) | 0.4 | 0.4 |
| Pure water | 39.9 | 69.9 | unit: % by weight

Comparative Example 2

A water base ink set for ink-jet recording having compositions shown in Table 6 was prepared by using a pigment ink as a black ink and using a dye ink as a magenta ink. A dye associated with a counter ion of sodium ion was used for the dye ink.

TABLE 6

| Comparative Example 2 | Pigment ink (black) | Dye ink (magenta) |
|---|---|---|
| CAB-O-JET 300 Black (produced by Cabot, pigment content: 15% by weight) | 33.0 | — |
| Direct Red 227 (counter ion: Na) | — | 3.0 |
| Glycerol | 26.0 | 26.0 |
| Dipropylene glycol monopropyl ether | 0.5 | 0.5 |
| RHEODOL SUPER TWO-120 (produced by Kao Corporation) | 0.2 | 0.2 |
| PROXEL GLX (S) (produced by Avecia) | 0.4 | 0.4 |
| Pure water | 39.9 | 69.9 | unit: % by weight

Comparative Example 3

A water base ink set for ink-jet recording having compositions shown in Table 7 was prepared by using a pigment ink as a black ink and using a dye ink as a yellow ink. A dye associated with a counter ion of sodium ion was used for the dye ink.

TABLE 7

| Comparative Example 3 | Pigment ink (black) | Dye ink (yellow) |
|---|---|---|
| CAB-O-JET 300 Black (produced by Cabot, pigment content: 15% by weight) | 33.0 | — |
| Direct Yellow 132 (counter ion: Na) | — | 3.0 |
| Glycerol | 26.0 | 26.0 |
| Dipropylene glycol monopropyl ether | 0.5 | 0.5 |
| RHEODOL SUPER TWO-120 (produced by Kao Corporation) | 0.2 | 0.2 |
| PROXEL GLX (S) (produced by Avecia) | 0.4 | 0.4 |
| Pure water | 39.9 | 69.9 | unit: % by weight

Comparative Example 4

A water base ink set for ink-jet recording having compositions shown in Table 8 was prepared by using a pigment ink as a black ink and using dye inks as a cyan ink, a magenta ink, and a yellow ink. Dyes associated with a counter ion of sodium ion were used for the dye inks.

TABLE 8

| Comparative Example 4 | Pigment ink (black) | Dye ink (cyan) | Dye ink (magenta) | Dye ink (yellow) |
|---|---|---|---|---|
| CAB-O-JET 300 Black (produced by Cabot, pigment content: 15% by weight) | 33.0 | — | — | — |
| Direct Blue 199 (counter ion: Na) | — | 3.0 | — | — |
| Direct Red 227 (counter ion: Na) | — | — | 3.0 | — |
| Direct Yellow 132 (counter ion: Na) | — | — | — | 3.0 |
| Glycerol | 26.0 | 26.0 | 26.0 | 26.0 |
| Dipropylene glycol monopropyl ether | 0.5 | 0.5 | 0.5 | 0.5 |
| RHEODOL SUPER TWO-120 (produced by Kao Corporation) | 0.2 | 0.2 | 0.2 | 0.2 |
| PROXEL GLX (S) (produced by Avecia) | 0.4 | 0.4 | 0.4 | 0.4 |
| Pure water | 39.9 | 69.9 | 69.9 | 69.9 | unit: % by weight

Evaluation

The total ion concentration of the potassium ion and the sodium ion and the total ion concentration of the divalent or multivalent ion or ions were measured respectively for the pigment inks and the dye inks of the water base ink sets for ink-jet recording prepared in Examples 1 to 4 and Comparative Examples 1 to 4 in the following method. Namely, the respective inks were filtrated with a centrifugal device MACROSEP 10K (produced by Nihon Pall Ltd.) in order to remove solid content from the respective inks. After that, metal ions contained in the respective inks were measured with an ICP (inductively coupled plasma) spectrometer ICPS-1000IV (produced by Shimazu Corporation). Obtained results are shown in Table 9. The microscopic observation was carried out to perform the evaluation, and the nozzle clog-up and the suction pump durability were evaluated by means of the following methods for the water base ink sets for ink-jet recording described above. Obtained results are shown in Table 10.

(1) Microscopic observation: One droplet of the pigment ink and one droplet of the dye ink were dropped on a slide glass while they were separated from each other. A cover glass was stationarily placed on the two droplets to allow the two liquids to make contact with each other under the cover glass. After that, the contact surface between the contacted two liquids was microscopically observed to confirm whether or not the pigment was coagulated. As for the ink sets prepared in Example 4 and Comparative Example 4, all of the four liquids of the pigment ink and the dye inks were allowed to make contact, and the contact surfaces between the contacted four liquids were microscopically observed. According to this method, it is possible to confirm whether or not the coagulation occurs in a state more approximate to the actual mixed state on the nozzle surface of the printing head and/or in the maintenance unit as compared with another coagulation test which is performed by mixing and agitating the pigment ink and the dye ink. The following evaluation criteria were adopted. +: No coagulation occurs, or even when any coagulation occurs, then coagulates are not more than about 20 μm, and coagulates have fluidity. –: Sizes of coagulates exceed about 20 μm, coagulates appear over the entire contact surface, and coagulates have no fluidity.

(2) Nozzle clog-up: A wiping test was carried out for the head nozzle surface continuously 3,000 times at room temperature. An ink-jet printer MFC-3100C (produced by Brother Industries, Ltd.) was used for the evaluation. The ink-jet printer has the following structure. That is, the nozzle arrays for discharging the black ink and the color ink respectively are disposed approximately to one another. When all of the nozzle arrays on the head nozzle surface are collectively subjected to the wiping in the horizontal direction, the black ink and the color ink make contact with each other. The following evaluation criteria were adopted. +: The discharge failure and the bending are not observed at all even in the wiping test for the head nozzle surface performed continuously 3,000 times. ±: The discharge failure and the bending are slightly observed in the wiping test for the head nozzle surface performed continuously 3,000 times. However, both of the discharge failure and the bending are restored by the purge operation performed not more than 5 times. –: The discharge failure and the bending are frequently observed in the wiping test for the head nozzle surface performed continuously 3,000 times. Further, both of the discharge failure and the bending are not restored in a short period of time.

(3) Evaluation of suction pump durability: A continuous suction purge test was carried out 10,000 times at room temperature. An ink-jet printer MFC-3100C (produced by Brother Industries, Ltd.) was used for the evaluation. The following criteria were adopted. ++: The amount of suction per one time is within a range of 0.26 to 0.30 cc as the prescribed amount in the continuous suction purge performed 10,000 times. +: The amount of suction per one time is not more than 0.26 cc as the lower limit value of the prescribed amount in the continuous suction purge performed 10,000 times. However, the amount of suction per one time is within a range of 0.26 to 0.30 cc as the prescribed amount in the continuous suction purge performed 5,000 times. ±: The amount of suction per one time is not more than 0.26 cc as the lower limit value of the prescribed amount in the continuous suction purge performed 5,000 times. However, the amount of suction per one time is within a range of 0.26 to 0.30 cc as the prescribed amount in the continuous suction purge performed 3,000 times. –: The amount of suction per one time is not more than 0.26 cc as the lower limit value of the prescribed amount in the continuous suction purge performed 3,000 times. It is assumed that those which acquired the results of "++" and "+" in the evaluation as described above satisfy the acceptable level.

TABLE 9

| | | Total ion concentration of potassium ion and sodium ion (ppm) | Total ion concentration of divalent or trivalent metal ion or ions (ppm) |
|---|---|---|---|
| Example 1 | Pigment ink (black) | 151 | 1.1 |
| | Dye ink (cyan) | 160 | 0.7 |
| Example 2 | Pigment ink (black) | 151 | 1.1 |
| | Dye ink (magenta) | 181 | 0.9 |
| Example 3 | Pigment ink (black) | 151 | 1.1 |
| | Dye ink (yellow) | 190 | 2.2 |

TABLE 9-continued

| | | Total ion concentration of potassium ion and sodium ion (ppm) | Total ion concentration of divalent or trivalent metal ion or ions (ppm) |
|---|---|---|---|
| Example 4 | Pigment ink (black) | 151 | 1.1 |
| | Dye ink (cyan) | 160 | 0.7 |
| | Dye ink (magenta) | 181 | 0.9 |
| | Dye ink (yellow) | 190 | 2.2 |
| Comp. Ex. 1 | Pigment ink (black) | 151 | 1.1 |
| | Dye ink (cyan) | 1680 | 2.3 |
| Comp. Ex. 2 | Pigment ink (black) | 151 | 1.1 |
| | Dye ink (magenta) | 1910 | 1.8 |
| Comp. Ex. 3 | Pigment ink (black) | 151 | 1.1 |
| | Dye ink (yellow) | 1690 | 1.9 |
| Comp. Ex. 4 | Pigment ink (black) | 151 | 1.1 |
| | Dye ink (cyan) | 1680 | 2.3 |
| | Dye ink (magenta) | 1910 | 1.8 |
| | Dye ink (yellow) | 1690 | 1.9 |

TABLE 10

| | Evaluation by microscopic observation | Evaluation of nozzle clog-up | Evaluation of suction pump durability |
|---|---|---|---|
| Example 1 | + | + | ++ |
| Example 2 | + | + | + |
| Example 3 | + | + | + |
| Example 4 | + | + | + |
| Comp. Ex. 1 | – | ± | ± |
| Comp. Ex. 2 | – | – | – |
| Comp. Ex. 3 | – | – | – |
| Comp. Ex. 4 | – | – | – |

As shown in Table 10, according to the water base ink sets for ink-jet recording prepared in Examples of the present invention, the dispersibility or the solubility was stable when the pigment ink and the dye ink were used singly, and the pigment coagulation was not caused when the pigment ink and the dye ink are subjected to the contact and the mixing. Therefore, the discharge failure was not caused, which would be otherwise caused when the pigment coagulate clogged the printing head nozzle head and/or when the pigment coagulate was adhered and secured to the surroundings of the nozzle to damage the repelling ink coat surface. Further, the nonuniform wiping and the deterioration of the air-tightness of the suction cap were not caused, which would be otherwise caused by the pigment coagulate adhered and secured to the wiper and the suction cap. Furthermore, the malfunction was not caused, which would be otherwise caused by the pigment coagulate adhered to the interior of the suction pump. Therefore, even when the maintenance unit was not constructed in a complicated manner, then the pigment ink and the dye ink were successfully used in combination, and the low cost, the high printing quality, and the high reliability were successfully realized simultaneously. On the other hand, the water base ink sets for ink-jet recording prepared in Comparative Examples involved the problem in any one of the evaluation tests.

As clarified from the fact explained above, even when the pigment ink and the dye ink are used in combination in the ink set for the ink-jet printer according to the present invention, the pigment is not coagulated by the contact and the mixing of the pigment ink and the dye ink. The printing quality is not deteriorated by the discharge failure which would be otherwise caused, for example, by the nozzle clog-up. Further, the pigment ink and the dye ink can be used in combination without complicating the structure of the maintenance unit. Therefore, the ink set of the present invention successfully contributes to the decrease in cost of the ink-jet recording apparatus. Therefore, when the water base ink set for ink-jet recording according to the present invention is used, it is possible to simultaneously realize the high printing quality and the high reliability with the ink-jet recording apparatus at the low cost.

What is claimed is:

1. A water base ink set for ink-jet recording comprising:
   a pigment ink which contains water, a water-soluble organic solvent, and a negatively charged pigment wherein a total ion concentration of potassium ion and sodium ion is not more than 200 ppm, and a total ion concentration of divalent or multivalent metal ion or ions is not more than 10 ppm; and
   a dye ink which contains water, a water-soluble organic solvent, and a water-soluble dye associated with a counter ion of lithium ion wherein a total ion concentration of potassium ion and sodium ion is not more than 400 ppm, and a total ion concentration of divalent or multivalent metal ion or ions is not more than 10 ppm.

2. The water base ink set for ink-jet recording according to claim 1, wherein the pigment ink is a black ink, and the dye ink is a color ink.

3. The water base ink set for ink-jet recording according to claim 1, wherein the total ion concentration of potassium ion and sodium ion contained in the dye ink is not more than 200 ppm.

4. The water base ink set for ink-jet recording according to claim 1, wherein the total ion concentration of divalent or multivalent metal ion or ions contained in the dye ink is not more than 5 ppm, and the total ion concentration of divalent or multivalent metal ion or ions contained in the pigment ink is not more than 5 ppm.

5. The water base ink set for ink-jet recording according to claim 1, wherein the water-soluble dye, which is contained in the dye ink, has a content of 0.5 to 10% by weight.

6. The water base ink set for ink-jet recording according to claim 1, wherein each of the pigment ink and the dye ink contains dipropylene glycol monopropyl ether.

7. The water base ink set for ink-jet recording according to claim 1, wherein the ink set is in a form of ink cartridge.

8. An ink-jet recording apparatus comprising:
   an ink-jet head which is formed with nozzles which jet an ink of a first color and nozzles which jet an ink of a second color different from the first color; and
   a maintenance unit which includes a wiper which wipes the nozzles for the first and second colors, a suction cap which caps the nozzles, a suction pump which sucks the ink by the suction cap, and a drain tank which stores a drain discharged from the suction pump, wherein:
   the ink of the first color is a pigment ink which contains water, a water-soluble organic solvent, and a negatively charged pigment wherein a total ion concentration of potassium ion and sodium ion is not more than 200 ppm, and a total ion concentration of divalent or multivalent metal ion or ions is not more than 10 ppm; and
   the ink of the second color is a dye ink which contains water, a water-soluble organic solvent, and a water-soluble dye associated with a counter ion of lithium ion wherein a total ion concentration of potassium ion and sodium ion is not more than 400 ppm, and a total ion concentration of divalent or multivalent metal ion or ions is not more than 10 ppm.

9. The ink-jet recording apparatus according to claim 8, wherein the first color is black, and the second color is one of magenta, yellow, and cyan.

10. The ink-jet recording apparatus according to claim 8, wherein the total ion concentration of potassium ion and sodium ion contained in the dye ink is not more than 200 ppm.

11. The ink-jet recording apparatus according to claim 8, wherein the total ion concentration of divalent or multivalent metal ion or ions contained in the dye ink is not more than 5 ppm, and the total ion concentration of divalent or multivalent metal ion or ions contained in the pigment ink is not more than 5 ppm.

12. The ink-jet recording apparatus according to claim 8, wherein the water-soluble dye, which is contained in the dye ink, has a content of 0.5 to 10% by weight.

13. The ink-jet recording apparatus according to claim 8, wherein each of the pigment ink and the dye ink contains dipropylene glycol monopropyl ether.

* * * * *